United States Patent
Wilson, III

(10) Patent No.: US 11,639,649 B2
(45) Date of Patent: May 2, 2023

(54) SYSTEMS AND METHODS FOR DATA ANALYSIS AND ASSET MANAGEMENT

(71) Applicant: Charles E. Wilson, III, Midland, TX (US)

(72) Inventor: Charles E. Wilson, III, Midland, TX (US)

( * ) Notice: Subject to any disclaimer, the term of this patent is extended or adjusted under 35 U.S.C. 154(b) by 352 days.

(21) Appl. No.: 16/786,046

(22) Filed: Feb. 10, 2020

(65) Prior Publication Data
US 2021/0246766 A1    Aug. 12, 2021

(51) Int. Cl.
| | | |
|---|---|---|
| *E21B 41/00* | (2006.01) | |
| *E21B 47/00* | (2012.01) | |
| *G06F 3/0484* | (2022.01) | |
| *G06Q 10/06* | (2012.01) | |
| *G06Q 50/06* | (2012.01) | |
| *G06Q 10/0639* | (2023.01) | |
| *G06F 3/04847* | (2022.01) | |

(52) U.S. Cl.
CPC .......... *E21B 41/0092* (2013.01); *E21B 47/00* (2013.01); *G06F 3/04847* (2013.01); *G06Q 10/06393* (2013.01); *G06Q 50/06* (2013.01)

(58) Field of Classification Search
CPC .. E21B 2200/20; E21B 41/0092; E21B 47/00; G06F 3/04847; G06Q 10/06393; G06Q 50/06
See application file for complete search history.

(56) References Cited

U.S. PATENT DOCUMENTS

| | | | | |
|---|---|---|---|---|
| 7,778,717 | B2 * | 8/2010 | Bachman | G05B 19/41885 |
| | | | | 700/83 |
| 8,649,909 | B1 * | 2/2014 | Phillips | G05D 7/0676 |
| | | | | 700/282 |
| 8,676,721 | B2 * | 3/2014 | Piovesan | G06Q 10/00 |
| | | | | 706/11 |
| 9,361,002 | B2 * | 6/2016 | Enkerud | G06F 9/451 |
| 2007/0150333 | A1 * | 6/2007 | Hurst | G06Q 10/04 |
| | | | | 705/7.34 |

(Continued)

FOREIGN PATENT DOCUMENTS

| | | | | |
|---|---|---|---|---|
| WO | WO-2011025471 A1 * | 3/2011 | | E21B 43/12 |
| WO | WO-2020023998 A1 * | 2/2020 | | |
| WO | WO-2020236637 A1 * | 11/2020 | | H01Q 1/2291 |

*Primary Examiner* — Daniel P Stephenson
(74) *Attorney, Agent, or Firm* — Miller IP

(57) ABSTRACT

Systems and methods for data analysis and asset management. The systems and methods may include receiving asset data about a plurality of different asset features of an oil well. The systems and methods may include receiving operational data corresponding to a plurality of different key performance indicators (KPIs) of an oil well. The systems and methods may include formulating a treatment strategy for the oil well based on one or more correlations between the asset data and the operational data. The systems and methods may include generating an operator user interface (UI) comprising information tailored in scope for a well operator. The systems and methods may include generating, by a processor, an engineer UI tailored in scope for an engineer user, wherein the engineer UI comprises one or more predictive calculators. The systems and methods may include selectively displaying by a display the operator UI.

20 Claims, 10 Drawing Sheets

(56) References Cited

U.S. PATENT DOCUMENTS

| | | | | |
|---|---|---|---|---|
| 2009/0040067 | A1* | 2/2009 | Mccoy | H04L 12/282 340/6.11 |
| 2012/0054270 | A1* | 3/2012 | Foreman | G06Q 10/10 709/203 |
| 2015/0046697 | A1* | 2/2015 | Galpin | G09C 1/00 713/155 |
| 2017/0364795 | A1* | 12/2017 | Anderson | G06N 20/10 |
| 2019/0169982 | A1* | 6/2019 | Hauge | E21B 41/0092 |
| 2021/0238971 | A1* | 8/2021 | Crumpton | E21B 43/12 |
| 2021/0246766 | A1* | 8/2021 | Wilson, III | G06Q 10/06393 |
| 2021/0317726 | A1* | 10/2021 | Tawil | G06Q 50/02 |
| 2021/0397994 | A1* | 12/2021 | Cerrahoglu | G06N 5/04 |

* cited by examiner

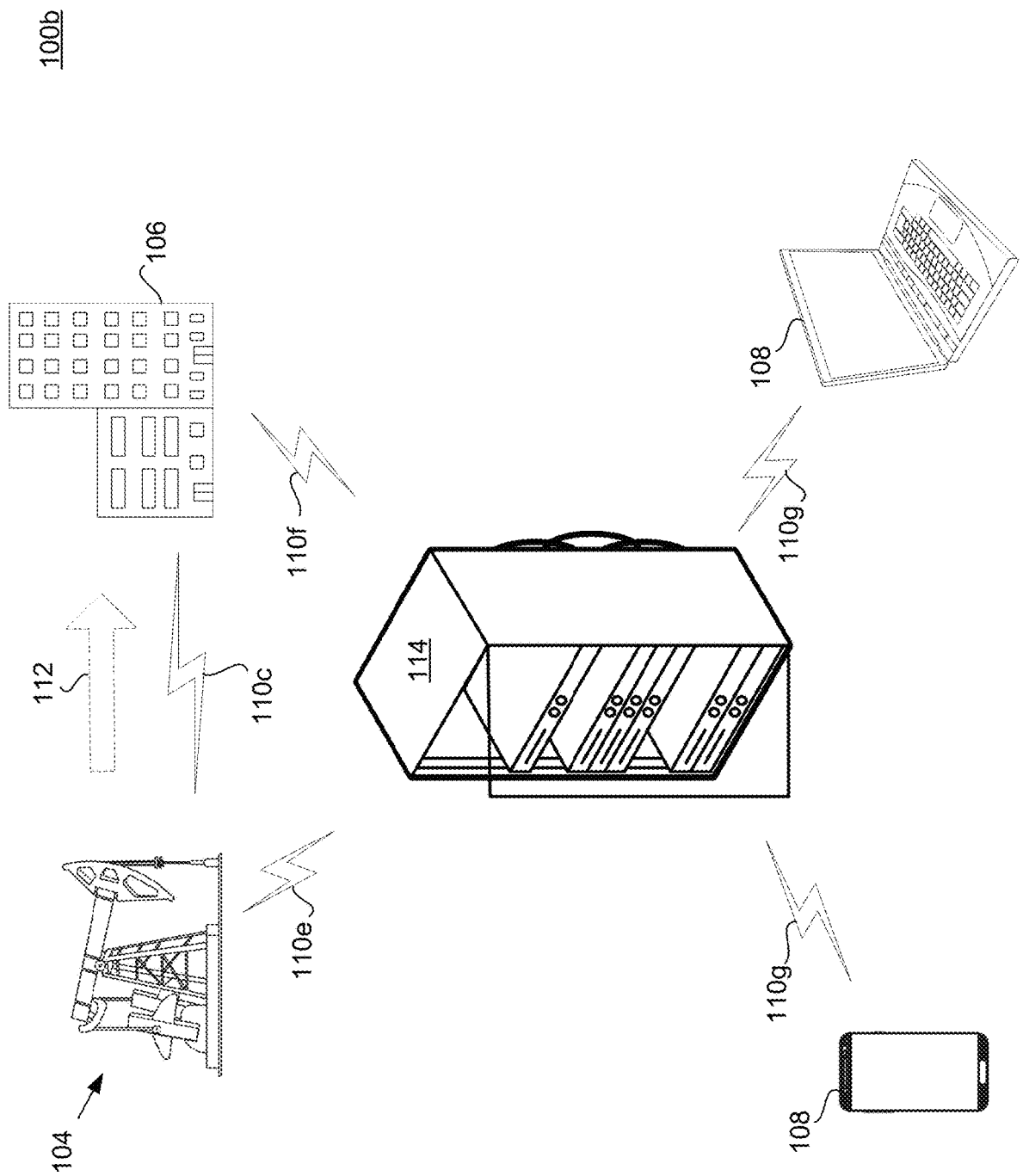

202

202a
Receive asset data, operations data, and flow metrics

202b
Compare operations data to specifications

202c
Assign a priority level to the oil well

202d
Identify KPI outlier

202e
Formulate treatment strategy based on diff. btwn. operations data and specs

202f
Generate an operator UI

202g
Generate an engineer UI

FIG. 2B

SYSTEMS AND METHODS FOR DATA ANALYSIS AND ASSET MANAGEMENT

BACKGROUND

The performance of a system may decline over time due to factors specific to the system. Those factors may be numerous and/or nuanced, requiring robust analysis by an expert. For example, production of an oil well over time may generally follow a decline curve, where initial production is high and drops logarithmically, then settles into a decreasing exponential decay. Maximizing a return on investment in the oil well may include slowing the decline curve of the oil well. Periodic assessment, analysis, and management of the oil well may slow the decline. Assessment of the oil well may yield numerous data points. Analysis of the data points may be performed by an expert trained in identifying factors that inhibit production of oil wells. The expert may recommend a management plan which may include chemical treatment of the well.

BRIEF DESCRIPTION OF DRAWINGS

The present description will be understood more fully when viewed in conjunction with the accompanying drawings of various examples of systems and methods for data analysis and asset management. The description is not meant to limit the systems and methods for data analysis and asset management to the specific examples. Rather, the specific examples depicted and described are provided for explanation and understanding of systems and methods for data analysis and asset management. Throughout the description, the drawings may be referred to as drawings, figures, and/or FIGs.

FIG. 1B illustrates a second asset monitoring and stimulation network 100*b*, according to an embodiment.

FIG. 2B illustrates a second method of formulating a treatment strategy for an asset and communicating the treatment strategy to an asset owner and/or operator, according to an embodiment.

DETAILED DESCRIPTION

Figure 1A:
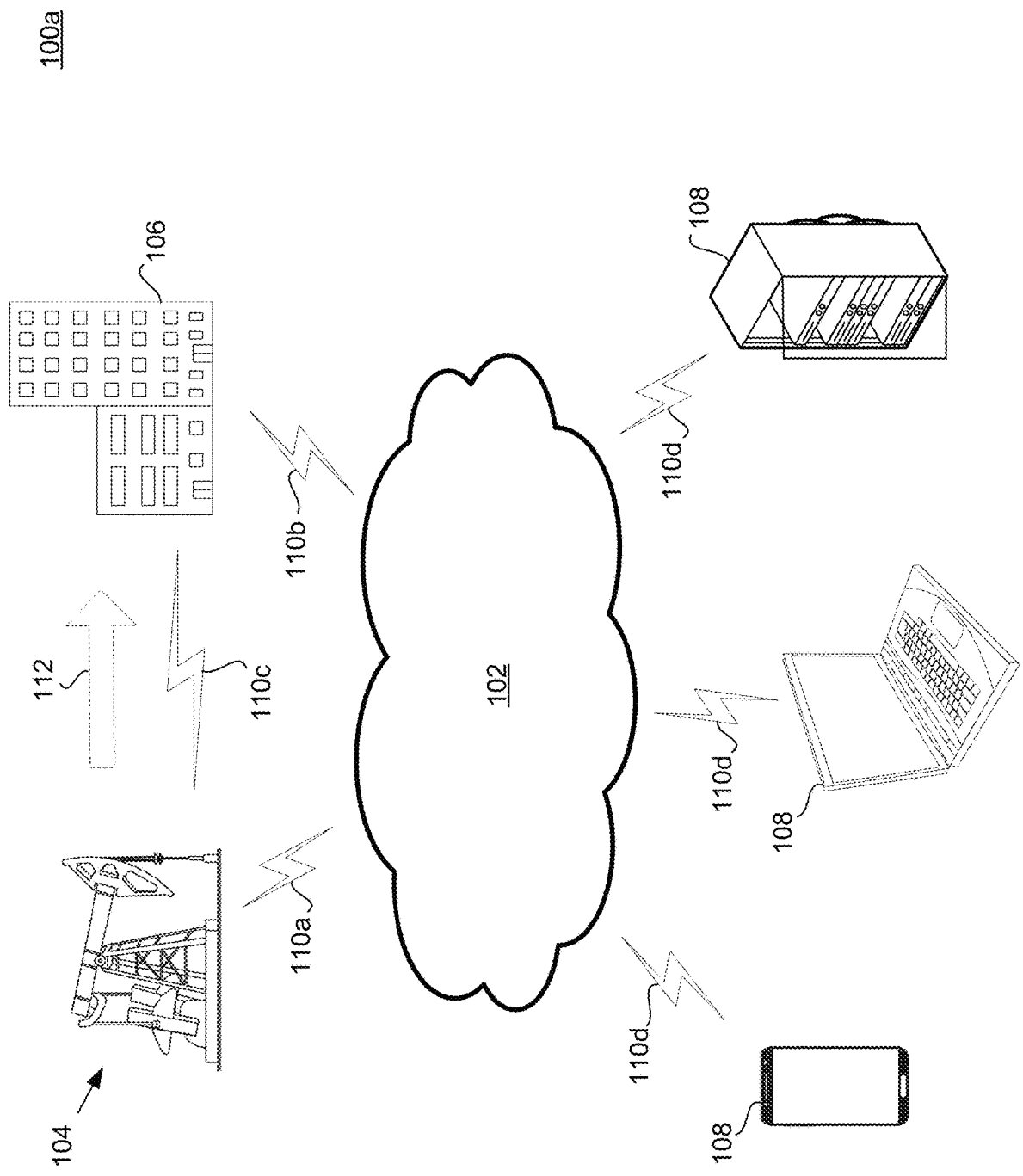
FIG. 1A illustrates a first asset monitoring and stimulation network, according to an embodiment.

Systems and methods for data analysis and asset management as disclosed herein will become better understood through a review of the following detailed description in conjunction with the figures. The detailed description and figures provide merely examples of the various embodiments of systems and methods for data analysis and asset management. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Throughout the following detailed description, examples of various systems and methods for data analysis and asset management are provided. Related elements in the examples may be identical, similar, or dissimilar in different examples. For the sake of brevity and clarity, related elements may not be redundantly explained in multiple examples. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, and use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted example embodiments.

Systems and methods for data analysis and asset management may include receiving, at a device such as a user device or a server, a status of a key performance indicator (KPI). The KPI may include a performance metric, a constituent that influences the performance metric, and/or an environmental condition that affects the performance metric. The systems and methods may include determining whether the status of the KPI is within a threshold of a specification for the KPI. The systems and methods may include formulating a remediation strategy when the status is outside the threshold. The systems and methods may include generating a display. The display may provide visual indication of a recommended action associated with the remediation strategy. The display may provide visual indication of the status of the KPI relative to the specification of the KPI. The display may include a prediction tool that may accept inputs associated with the KPI and the remediation strategy and generate predictive outputs based on the inputs. The systems and method may include generating the display in an operational view or an engineering view. In one example, the systems and methods may be applied to an oil well to improve production of the oil well.

Conventional analysis and/or remediation schemes may include periodic assessment, analysis, and remediation. For example, in the oil and gas industry, various performance indicators may be used to assess a state of a well. Some performance indicators may be directly measured, such as flow rate, temperature, pressure, and so forth. Some performance indicators may require assessment by a lab, such as a chemical composition of a wellstream (e.g. well product flowing in a flowline of the oil well), biological content of the wellstream, and so forth. Assessment of the oil well may yield numerous data points. The data points may be collected together and provided to an expert for analysis and recommendation of a stimulation plan for the oil well.

Because the number of oil wells needing analysis and the amount of data generated by the analysis may be vast, analysis may take weeks or months. By the time analysis is complete, the resulting stimulation plan may be obsolete, and further damage and/or decline may have occurred to the oil well. The report generated by the expert may be dense, and it may be difficult for an operator of the oil well to interpret what the stimulation plan is and/or how to implement the stimulation plan. Additionally, because of uncertainties in the assessment and changes over time to an oil well, the analysis may output a stimulation plan that results in over-treatment. The over-treatment may not be identified until long after the over-treatment was initiated, causing a decrease in revenue to the operator due to unnecessary treatment costs. Furthermore, the experts may be susceptible to influence by manufacturers of treatment chemicals, which may encourage the experts to recommend overtreatment or not remedy previously unidentified overtreatment.

Another issue may be an expertise gap that may result in a loss of expertise, and therefore quality of analysis, as older experts retire. For example, the oil and gas industry includes a cluster of consultants near retirement and a cluster of consultants newly entering the field. The older cluster of consultants may have enough expertise to effectively and efficiently analyze oil well production but may not have the skills or technological wherewithal to pass on that expertise. The younger cluster may have less expertise but may be more technologically savvy.

Furthermore, other problems may be inherent in data-intensive technical fields. In a variety of fields, such as oil and gas exploration, production, and refinement, a vast compendium of interacting factors extend objective analysis of the interacting factors beyond the practical and/or realistic capabilities of human processing. Previously such challenges have been met by employing human intuition informed by experience. However, such intuition is often fallible, subjective, and prone to influence.

The systems and methods for data analysis and asset management disclosed herein may address at least some of the issues described above regarding conventional analysis and/or remediation schemes. Data analysis may be streamlined and significantly accelerated such that assessment data is still relevant when a remediation strategy is generated. Expertise in data analysis may be durably recorded in a technology that may be accessible for younger consultants to learn, use, and contribute to. Actionable data may be readily available to non-experts. Removing experts from the direct line of data analysis may eliminate incentives for interested third parties to influence the experts in a way that may diminish returns on investment (ROI) of asset owners and/or operators. For example, in the oil and gas industry, the systems and methods for data analysis and asset management may be used by a well operator, without intermediary analysis by an expert, to determine a stimulation strategy for the well. Specific instructions that are quickly and easily understandable to the operator may be output, which may enable the operator to implement the stimulation strategy while the strategy is still relevant.

Additionally, the systems and methods for data analysis and asset management described herein may churn through vast data of cross-linked interactions to output actionable items that are objective, concise, and precise. The systems and methods for data analysis and asset management described herein may leverage all the cross-linked data and the speed of machine processing to return actionable items in a time frame and with such precision that optimized the productivity of an asset such as an oil well.

FIG. 1A illustrates a first asset monitoring and stimulation network 100a, according to an embodiment. Some of the features in FIG. 1A are the same as or similar to some of the features in the other FIGs. described herein as noted by same and/or similar reference characters, unless expressly described otherwise. Additionally, reference may be made to features shown in any of the other FIGs. described herein and not shown in FIG. 1A. In an embodiment, systems and methods for data analysis and asset management may be applied to an industry where declining asset condition, quality, and/or performance may lead to reduced ROI. Such an industry may include the oil and gas industry, including oil wells, upstream assets, downstream assets, midstream assets, and so forth. Such an industry may include a manufacturing industry, a sporting industry, a construction industry, a property maintenance industry, and so forth. Specific examples described herein may be described regarding the oil and gas industry. However, a person of skill in the art of data analytics may understand how the systems and methods described herein may apply to other industries where revenue-generating assets decline in production value and can be lifted by remediation.

In an embodiment, the first asset monitoring and stimulation network 100a may include a server 102, an asset 104, an assessor 106, and one or more user devices 108. The server 102 and the asset 104 may communicate via the first network link 110a. The server 102 may and the assessor 106 may communicate via the second network link 110b. The asset 104 and the assessor 106 may communicate via the third network link 110c. The server 102 and the user device 108 may communicate via the fourth network link 110d. Additionally, physical samples may be passed from the asset 104 to the assessor 106 via the physical transport line 112.

The network links 110a-d, and other network links described herein, may be direct or indirect. A direct link may include a link between two devices where information is communicated from one device to the other without passing through an intermediary. For example, the direct link may include a Bluetooth™ connection, a Zigbee® connection, a Wifi Direct™ connection, a near-field communications (NFC) connection, an infrared connection, a wired universal serial bus (USB) connection, an ethernet cable connection, a fiber-optic connection, a firewire connection, a microwire connection, and so forth. In another example, the direct link may include a cable on a bus network. "Direct," when used regarding a network communication link, may refer to any of the aforementioned direct communication links.

An indirect link may include a link between two or more devices where data may pass through an intermediary, such as a router, before being received by an intended recipient of the data. For example, the indirect link may include a wireless fidelity (WiFi) connection where data is passed through a WiFi router, a cellular network connection where data is passed through a cellular network router, a wired network connection where devices are interconnected through hubs and/or routers, and so forth. The cellular network connection may be implemented according to one or more cellular network standards, including the global system for mobile communications (GSM) standard, a code division multiple access (CDMA) standard such as the universal mobile telecommunications standard, an orthogonal frequency division multiple access (OFDMA) standard such as the long term evolution (LTE) standard, and so forth. "Indirect," when used regarding a network communication link, may refer to any of the aforementioned indirect communication links.

In an embodiment, communication between the server 102, the asset 104, the assessor 106, and/or the user device 108 may be enabled by a communication component integrated in and/or associated with the server 102, the asset 104, the assessor 106, and/or the user device 108. The communication component may include a networking device such as a networking chip, one or more antennas, and/or one or more communication ports. The networking device may generate radio frequency (RF) signals and transmit the RF signals to one or more of the antennas. The networking device may receive and/or translate the RF signals. The network device may transceive the RF signals. The RF signals may be broadcast and/or received by the antennas. The networking device may generate electronic signals and transmit the RF signals to one or more of the communication ports. The networking device may receive the RF signals from one or more of the communication ports. The electronic signals may be transmitted to and/or from a communication hardline by the communication ports. The networking device may generate optical signals and transmit the optical signals to one or more of the communication ports. The networking device may receive the optical signals and/or may generate one or more digital signals based on the optical signals. The optical signals may be transmitted to and/or received from a communication hardline by the communication port, and/or the optical signals may be transmitted and/or received across open space by the networking device.

In various embodiments, the communication component may include hardware and/or software for generating and communicating signals over a direct and/or indirect network communication link. For example, the communication component may include a USB port and a USB wire, and/or an RF antenna with Bluetooth™ programming installed on a processor, such as the processing component, coupled to the antenna. In another example, the communication component may include an RF antenna and programming installed on a processor, such as the processing component, for communicating over a Wifi and/or cellular network. As used herein, "communication device" and/or "communication component" may be used generically herein to refer to any or all of the aforementioned elements and/or features of the communication component.

In various embodiments, the server 102 may include an application server, a database, a web server, a real-time communication server, a file transfer protocol server, a collaboration server, a list server, a telnet server, a mail server, and so forth. The server 102 may include two or more server types. The server 102 may include a physical server and/or a virtual server. The server 102 may store and execute instructions for analyzing data and generating outputs associated with the data. In an embodiment, the server 102 may include a cloud-based server. The server 102 may be physically located remotely from the asset 104, the assessor 106, and/or the user device 108.

In various embodiments, the asset 104 may include an industry asset used by an owner and/or operator. For example, the asset 104 may be an oil well. The oil well may include a wellhead, a separator, a storage tank battery, flowlines, meters, sensors, and so forth. The sensors may be positioned around the oil well to collect asset information and/or data regarding key performance indicators (KPIs) of the oil well. The sensors may be communicatively coupled to one or more communication components of the oil well. The communication components may communicate the asset information and/or the KPIs to the server 102 and/or the assessor 106. In some embodiments, samples from the oil well may be physically tested and/or analyzed, such as on-site or at the assessor 106. Results of the testing may include one or more of the KPIs. In some embodiments, the samples may be physically transported from the oil well to the assessor 106 via the physical transport line. In some embodiments, the assessor 106 may travel to the oil well to test the samples.

In various embodiments, the assessor 106 may include a testing laboratory, testing equipment, and/or one or more individuals that conduct the testing. The communication component of the assessor 106 may include, for example, an internet-connected device such as a personal computer, a mobile device, a tablet computer, the testing equipment, a laboratory server, and so forth. The internet-connected device may accordingly be associated with the assessor 106 such that testing and assessment performed by the assessor 106, such as testing performed on samples at the laboratory or on-site testing performed by an individual associated with the laboratory, and so forth, may be communicated to the server 102 and/or the asset 104.

The user device 108 may include a client device such as a mobile phone, a personal computer, a local server, and so forth. The client device may send requests to the server 102 for information, data, and/or action items associated with the asset 104 and/or the assessor 106. The server 102 may send the requested information, data, and/or action items to the client device. The information, data, and/or action items may be based on analytics performed at the server 102 asset information, KPIs, and so forth.

The first asset monitoring and stimulation network 100a may enable an owner and/or operator of the asset 104 to rapidly respond to changes in performance of the asset 103. For example, in embodiments where the asset 104 includes an oil well, KPIs and asset information may be and analyzed at the server 102. The server 102 may generate information and/or a stimulation strategy in response to a decline in production of the oil well. The stimulation strategy may be transmitted to the operator via the user device 108, and the operator may implement the stimulation strategy before the strategy becomes obsolete.

FIG. 1B illustrates a second asset monitoring and stimulation network 100b, according to an embodiment. Some of the features in FIG. 1B are the same as or similar to some of the features in the other FIGs. described herein as noted by same and/or similar reference characters, unless expressly described otherwise. Additionally, reference may be made to features shown in any of the other FIGs. described herein and not shown in FIG. 1B. The network 100b may include the asset 104, the assessor 106, the user device 108, and a local server 114. In an embodiment, instructions for analyzing asset information and/or KPI data may be stored on the local server 114. The local server 114 may be proprietary to the owner and/or operator of the asset 104. The local server 114 and the asset 104 may communicate via the fifth network link 110e. The local server 114 and the assessor 106 may communicate via the sixth network link 110f. The local server 114 and the user device 108 may communicate via the seventh network link 110g.

Figure 2A:
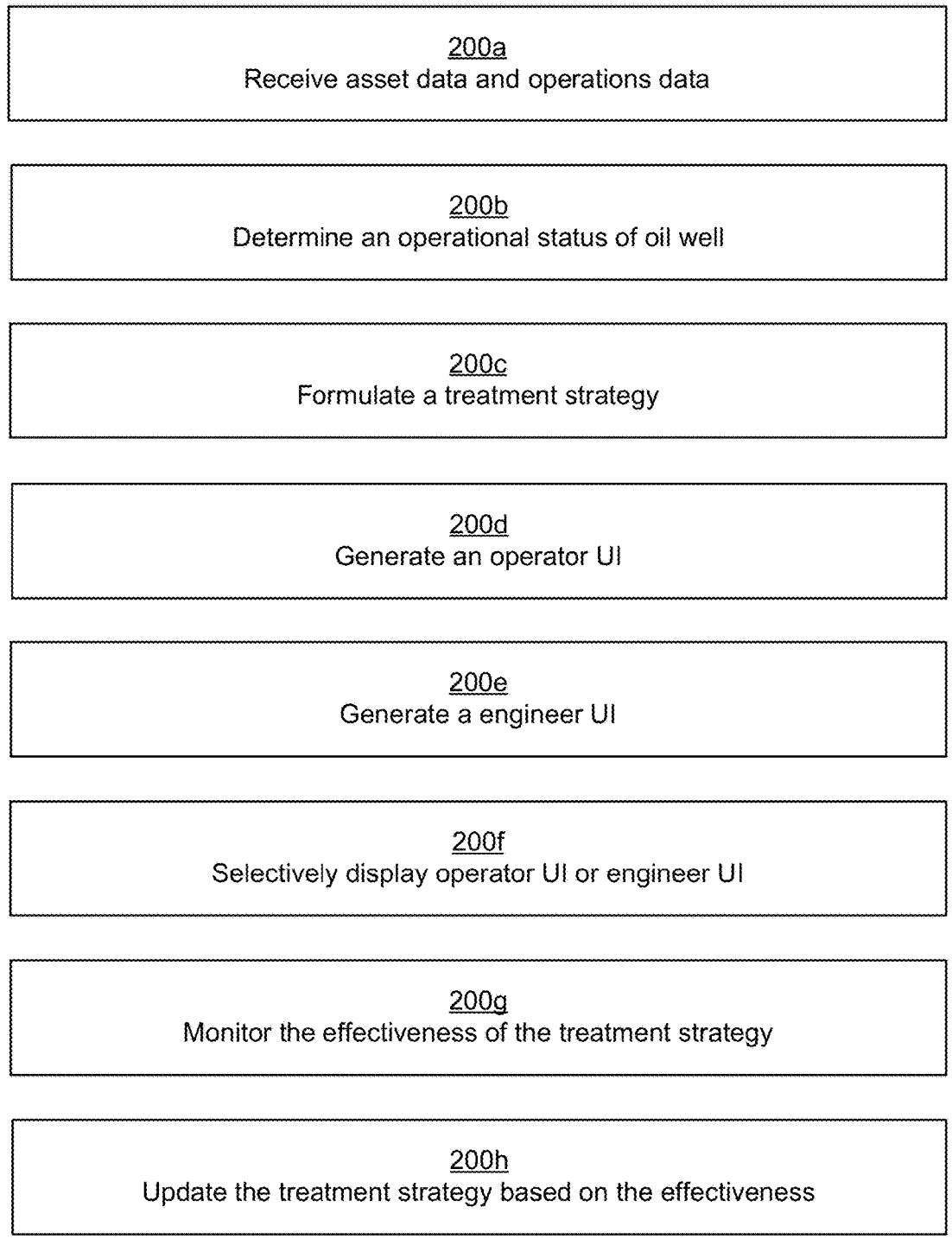
FIG. 2A illustrates a first method of formulating a treatment strategy for an asset and communicating the treatment strategy to an asset owner and/or operator, according to an embodiment.

FIG. 2A illustrates a first method 200 of formulating a treatment strategy for an asset and communicating the treatment strategy to an asset owner and/or operator, according to an embodiment. Some of the features in FIG. 2A are the same as or similar to some of the features in the other FIGs. described herein as noted by same and/or similar reference characters, unless expressly described otherwise. Additionally, reference may be made to features shown in any of the other FIGs. described herein and not shown in FIG. 2A. The method 200 may include: receiving asset data and operations data associated with an oil well (block 200a); determining an operational status of the oil well (block 200b); formulating a treatment strategy for the oil well (block 200c); generating an operator user interface (UI) (block 200d); generating an engineer UI (block 200e); selectively displaying the operator UI or the engineer UI (block 200f); monitoring an effectiveness of the treatment strategy (200g); and updating the treatment strategy based on the effectiveness (200h).

In an embodiment, the asset data may regard one or more of a plurality of different asset features of an oil well. The asset features may include structural components and/or assets of the oil well such as a reservoir, a downhole flowline, a wellhead, a christmas tree, various valves, various gauges, above-ground flowline, a wellstream, a storage tank, a separator, and so forth. The asset features may may be drawn from an asset categore, including asset integrity, flow assurance, and/or phase separation. Asset integrity may relate to failures and/or leaks (i.e. flowline leaks and blockages, valve failures, and so forth), corrosion (i.e. acid gas-induced, bacteria-induced, flow-induced, mechanically-induced, and so forth), bacteria-related issues, under deposit corrosion, non-sales gas issues, sales gas issues, reservoir souring, and so forth. Flow assurance may be influenced by mineral deposits, scale deposits, asphaltene deposits, paraffin deposits, foam, liquid loading, hydrates, plugging agents, and so forth. Flow assurance factors may cause low production which may be addressed through stimulation and/or remediation. Phase separation may refer to fluid phase issues of the wellstream such as water quality issues, emulsion agents and tendencies, and fluid and gas separation.

Other asset features may generally include: other flowline issues; failure rates of the flowline, valves, and so forth; results of ultrasonic testing (UT) scans to determine metal thickness of various assets; lifting costs; source water features; whether fluids are reused; fluid and/or ambient temperatures; fluid and/or gas pressures; scaling indices and risk assessments of scaling; water and oil cut (i.e. ratio); barrel of oil equivalents of production; costs associated per barre of water, barrel of oil, total fluid, and/or barrel of oil equivalent; other customer-supplied inputs and/or information about the oil well; and so forth.

In an embodiment, the operations data may correspond to one or more of a plurality of different key performance indicators (KPIs). The KPIs may include: a pH of the wellstream; a wellstream temperature; a wellstream pressure; a wellstream volume; a location at the oil well where a measurement or a sample is taken (e.g. along the flowline, at the wellhead, downhole, and so forth); a type of artificial lift employed at the oil well; a wellstream aqeuous $CO_2$ content; a wellstream aqueous $H_2S$ content; a wellstream aqueous $O_2$ content; a $CO_2$ partial pressure of the wellstream; an $H_2S$ partial pressure of the wellstream; an amount of gaseous $CO_2$ in the wellstream; an amount of gaseous $H_2S$ in the wellstream; a wellstream iron content; a wellstream manganese content; an amount of sulfate-reducing bacteria (SRB) in the wellstream; an amount of acid-producing bacteria (APB) in the wellstream; an adenosine content of the wellstream (e.g. adenosine triphosphate, adenosine monophosphate, and so forth); corrosion of oil well assets due to the wellstream; paraffin content of the wellstream; asphaltene content of the wellstream; a calcium carbonate content of the wellstream; a barium sulfate content of the wellstream; an iron sulfide content of the wellstream; an iron carbonate content of the wellstream; a hydrous or anhydrous calcium sulfate content of the wellstream; a strontium sulfate content of the wellstream; a strontium carbonate content of the wellstream; a millipore throughput of the wellstream; a hydrocarbon content of the wellstream; a salt content of the wellstream; a carbonate content of the wellstream; a soluble acid content of the wellstream; an insoluble acid content of the wellstream; a total solids content of the wellstream; a total suspended solids content of the wellstream; a total dissolved solids content of the wellstream; a volatile suspended solids content of the wellstream; a hardness of the wellstream; an alkalinity of the wellstream; a bicarbonate compound content of the wellstream; a conductivity of the wellstream; a resistivity of the wellstream; a phosphate content of the wellstream; an amine content of the wellstream; a phosphonate content of the wellstream; a chloride content of the wellstream; a sodium content of the wellstream; a specific gravity of the wellstream; a water-in-oil content of the wellstream; an oil-in-water content of the wellstream; an american petroleum institute (API) gravity of the wellstream; a cloud point of the wellstream; a pour point of the wellstream; an oil content of the wellstream; a grease content of the wellstream; a basic sediment and water (BS&W) grindout of the wellstream; gas chromatography results of the wellstream; a wax appearance temperature (WAT) of the wellstream; a cation content of the wellstream (e.g. calcium, magnesium, iron, manganese, barium, strontium, sodium, potassium, zinc, lead, silicon, boron, phosphorus, aluminum, lithium, ammonium, sulfur, and so forth); an anion content of the wellstream (e.g. chloride, sulfate, bicarbonate, carbonate, bromide, fluoride, acetate, propanoate, butanoate, isobutanoate, and so forth); and/or a dissolved gas content of the wellstream (e.g. $CO_2$, $H_2S$, oxygen, ammonia, and so forth).

In various embodiments, the operational status of the oil well may include: a flow rate of the wellstream; a production of the oil well (e.g. barrels per day, liters per minute, and so forth); a barrels of oil equivalent production of the oil well; a production decline of the oil well; a return-on-investment of the oil well and/or treatments of the oil well; a quality of the asset data when compared against specifications for the asset data; a quality of the operations data and/or KPIs when compared against specifications for the operations data and/or KPIs; and so forth. In various embodiments, the operational status of the oil well may be based on the asset data and/or the operations data. The operational status may indicate the oil well is a stimulation candidate or the oil well is a remediation candidate. For example, the operational status may be "stimulation candidate," where the oil well is labeled as a stimulation candidate. In another example, the operational status may be "remediation candidate," where the oil well is labeled as a remediation candidate.

In an embodiment, the operational status may be determined by evaluating the asset data, the operations data, or the asset data and the operations data in light of each other, i.e. by correlating the asset data to the operations data. For example, the asset data may indicate a decreased production of the oil well and/or a phase separation metric of the wellstream that departs from an optimal phase separation metric. The operations data may include a plurality of KPIs related to the decreased production and/or the phase separation metric. Viewed alone, the asset data may indicate a problem with the oil well or may be indicative of non-asset-related production decline. Viewed alone, the operations data may indicate a production problem, unless production is standard, i.e. according to specification or as-expected. Viewed together, the asset data may indicate a problem with the oil well when the KPIs are not-to-specification. The problem may indicate the oil well is a candidate for stimulation or a more intensive process of remediation. In an embodiment, stimulation may include chemical treatment. In an embodiment, remediation may include chemical treatment, repair and/or replacement of an oil well asset, an overhaul of the oil well, and so forth.

In various embodiments, the treatment strategy may include a preventative strategy, a stimulation strategy, and/or a remediation strategy. The preventative strategy may be formulated and/or employed when the operational status of the oil well is optimal, e.g. production is maximized, but operating data regarding one or more KPIs indicate a future production problem. For example, a gas content of the wellstream may indicate a future problematic level of foaming in a downstream separator. The preventative strategy may include applying an anti-foaming agent upstream from the separator and/or applying a defoamer at the separator. The stimulation strategy may be formulated and/or employed, for example, when a production drop-off (i.e. rate of decline) is observed. The stimulation strategy may be formulated to address one or more causes of the drop-off. The oil well may be identified as a stimulation candidate when a change in an asset feature or a KPI falls within a specified range. Similarly, the remediation strategy may be formulated and/or employed, for example, when a more dramatic production drop-off is observed. The oil well may be identified as a remediation candidate when the change in the asset feature or the KPI falls beyond the specified range.

In various embodiments, the treatment strategy may be formulated based on the asset data, the operating data, and/or the operational status. The treatment strategy may be targeted to improve asset reliability, enhance production, and/or reduce lifting costs. The treatment strategy may be formulated based on one or more correlations between the asset data, the operations data, and/or the operational status. For example, corrosion of an asset may be indicated by iron in the wellstream. Determining an amount of corrosion may include assessing a variety of manifestations of iron in the wellstream and/or flowline. The iron may be: a suspended solid; ionic; a scale such as iron sulfide; and so forth. Other indicators of the amount of corrosion may include iron loss per day calculated based on production, microbial content of the wellstream, mechanical shearing, flow velocity, pitting, cavitation, treatment frequency for treatment of iron loss, and so forth. Formulating a treatment strategy for addressing corrosion may include cross-linking these and/or other factors. For example, an amount of iron scale may not show up directly in an analysis but may be determined from a decrease in production and some presence of iron scale. A total amount of corrosion may be determined by, for example, summing and/or cross-linking the various data regarding iron to return a total amount of corrosion. Additionally, formulating the treatment strategy may include addressing different causes of the corrosion. For example, the corrosion may be caused by cavitation, scaling, and microbial activity. The treatment strategy may include one or more actions, such as applying a chemical treatment to the wellstream, to address the corrosion.

In various embodiments, the correlations between the asset data and/or the operations data may indicate one or more problems with the oil well. The problems may include a degradation of an asset feature, a blockage of the wellstream, or a condition of a fluid in the wellstream that causes production to be less than a maximum potential production of the oil well. As an example of the condition, over-foaming can interfere with gas separation. The treatment strategy may include applying a chemical treatment to resolve the degradation, the blockage, or the condition.

In various embodiments, the treatment strategy may include applying a chemical treatment product. The chemical treatment product may be targeted to address a particular asset feature and/or KPI, or may generally address multiple asset features and/or KPIs. In various embodiments, the chemical treatment product may include a biocide, a corrosion inhibitor, a scale inhibitor, a scale dissolver, a defoamer, a reverse breaker, an emulsion breaker, a foamer, a surfactant, a friction reducer, an $H_2S$ scavenger, a hydrate inhibitor, an iron sulfide dissolver, an oxygen scavenger, an asphaltene inhibitor, an asphaltene dispersant, an asphaltene solvent, a paraffin inhibitor, a paraffin solvent, a paraffin dispersant, a water clarifier, and so forth.

In a specific embodiment, the oil well may be currently undergoing treatment, i.e. "on treatment." Various KPIs may return as "out-of-spec" (i.e. different than what may be specified for the various KPIs). Formulating the treatment strategy may include amending, e.g. increasing, a chemical injection rate by a percentage corresponding to how far out-of-spec the KPIs may be. Formulating the treatment strategy may include chemical injection at a specified location. Formulating the treatment strategy may include remeasuring the KPIs and iterating the amendments until the KPIs com "in-spec." Amendments may be limited by a treatment range and/or treatment thresholds which trigger sourcing new chemical treatment product).

In a specific embodiment, the oil well may not be on treatment. Formulating the treatment strategy may include identifying a treatment candidate, i.e. KPI, and chemistry type. Based on a severity by which the KPI is out-of-spec, formulating the treatment strategy may include determining treatment frequency, treatment dosage rate, application type (e.g. applying the chemical treatment product as a batch or continuously), and an injection point.

In various embodiments, the treatment strategy may include monitoring post-treatment asset data and/or post-treatment operations data. The treatment strategy may include a frequency of monitoring based on a difference between a status of an asset feature and/or KPI and a specification for the asset feature and/or KPI. The monitoring frequency may include a frequency with which the asset feature and/or the KPI is re-checked and/or compared to the corresponding specification. The monitoring frequency may include a frequency of assessing the asset feature and/or the KPI during execution of the treatment strategy. The monitoring frequency may include comparing a current asset feature and/or KPI assessed during execution of the treatment strategy to the corresponding specification. The monitoring frequency may be selected to minimize an amount of treatment chemical applied to the oil well to stimulate or remediate the oil well. For example, if the KPI is out-of-spec by a small margin, the monitoring frequency may be higher than if the KPI is out-of-spec by a larger margin. Checking more frequently when the margin is smaller may prevent over-treatment and therefore profit loss due to unnecessary expenses.

In various embodiments, the operator UI may be tailored in scope for a well operator. A well operator may include an owner, leaseholder, and/or operator of one or more of the oil well assets. The well operator may include an individual that is untrained in data analysis. The well operator may include an individual that is trained in and/or specializes in managing and/or maintaining one or more the oil well assets. The operator UI may accordingly include information and/or interactive elements that may be of interest and/or use to the well operator in managing and/or maintaining the oil well assets.

In various embodiments, the operator UI may include the operational status of the oil well. The operational status may be displayed in the operator UI as text, one or more icons, one or more colors or color schemes, one or more symbols, and so forth. For example, the operational status may be conveyed by a color scheme. The color scheme may include a first color indicating the oil well is not a treatment candidate, a second color indicating the oil well is a preventative treatment candidate, a third color indicating the oil well is a stimulation candidate, and/or a fourth color indicating the oil well is a remediation candidate.

In various embodiments, the operator UI may include the treatment strategy and/or an action item associated with the treatment strategy. The action item and/or treatment strategy may be displayed in the operator UI as text, one or more icons, one or more symbols, one or more colors and/or color schemes, and so forth. For example, the action item may be displayed in the operator UI as a symbol. The symbol may provide a visual indication of the action item. The symbol may include an arrow. A direction the arrow is pointed in may indicate the action item is increasing or decreasing an amount of chemical treatment product applied to the wellstream.

In various embodiments, the engineer UI may be tailored in scope for an engineer user. An engineer user may include an individual trained in data analytics and/or engineering. An engineer user may indirectly participate in management and/or maintenance of the oil well through analyzing data to identify and/or evaluate production trends, determine return on investment, track asset and/or oil well failures, evaluate treatment strategies, and so forth. An engineer user may validate and/or augment a treatment strategy for the oil well. Accordingly, the engineer UI may include various forms, data displays, calculators, asset displays, KPI displays, treatment displays, and so forth.

In various embodiments, the operator UI or the engineer UI may be selectively displayed based on a type of user. For example, the user may include the well operator and the operator UI may be displayed to the well operator. The user may include the engineer user and the engineer UI may be displayed to the engineer user. The operator UI and the engineer UI may be bifurcated from each other to provide targeted information for efficiently tackling oil well production issues. For example, the treatment strategy may include one or more specific action items for stimulating and/or remediating the oil well. The well operator may be interested in knowing the specific action items in order to implement the treatment strategy. Inundating the well operator with a plethora of data, trends, calculators, and so forth may prevent the well operator from efficiently, if ever, implementing the treatment strategy. Accordingly, excluding the more complex data analysis views and information may enable the well operator to immediately identify from the operator UI, and then act on, the action items of the treatment strategy. In another example, the engineer user may use the plethora of data, trends, calculators, and so forth to identify further actionable items and/or treatment strategies to enhance production, prolong asset reliability, and so forth.

In various embodiments, elements and/or information displayed via the operator UI or the engineer UI may be generated as graphical objects. The graphical objects may include text, icons, symbols, images, colors, color schemes, and so forth.

In various embodiments, the effectiveness of the treatment strategy in stimulating and/or remediating the oil well may be monitored by assessing subsequent asset data and/or subsequent operations data that are received subsequent to implementation of the treatment strategy. For example, the effectiveness of the treatment strategy may be indicated by one or more KPIs coming into spec (effective), maintaining out-of-spec (ineffective), or diverging further from spec (ineffective). The treatment strategy may be updated based on the effectiveness by decreasing an amount of treatment chemical applied to the oil well, increasing the amount of treatment chemical applied to the oil well, or applying a different treatment chemical to the oil well.

In a specific example, many or all inputting factors (i.e. asset features, KPIs, treatment chemicals, and so forth), conditions, process changes, and statuses may be continually evaluated during and/or after treatment with the goal to protect the integrity of the customers asset and to ensure optimal flow assurance is achieved. Monitoring and updating the treatment strategy may be iterated until production results are optimized and/or the various KPIs are brought within spec. In some embodiments, production results and/or KPI limits may be overridden or adjusted based on a customer's request or budgetary concerns.

FIG. 2B illustrates a second method 202 of formulating a treatment strategy for an asset and communicating the treatment strategy to an asset owner and/or operator, according to an embodiment. Some of the features in FIG. 2B are the same as or similar to some of the features in the other FIGs. described herein as noted by same and/or similar reference characters, unless expressly described otherwise. Additionally, reference may be made to features shown in any of the other FIGs. described herein and not shown in FIG. 2B. The method 200 may include: receiving asset data, operations data, and/or flow metrics associated with an oil well (block 202*a*); comparing the operations data to specifications for the operations data (block 202*b*); assigning the oil well a treatment priority level (block 202*c*); Identifying an outlier data point of the operations data or the asset data (block 202*d*); formulating a treatment strategy (block 202*e*); generating an operator UI (block 202*f*); and/or generating an engineer UI (202*g*).

In an embodiment, the flow metric may include a pretreatment flow metric of the wellstream. The flow metric may include, for example, a flow rate of the wellstream, a volume of the wellstream, and so forth. The flow metric may have a specification and/or an expected value. The specification may be determined in light of one or more asset features and/or KPIs. The specification may be determined in light of an age of the oil well. For flow metric values within a first range of the specification, the oil well may be identified as a candidate for preventative treatment. For flow metric values within a second range of the specification, the oil well may be identified as a stimulation candidate. For a flow metric outside the second range of the specification, the oil well may be identified as a remediation candidate. The operator UI may include a treatment status indicators. When the flow metric is within the first range, the treatment status indicator may indicate the treatment strategy includes preventative treatment. When the flow metric is outside the first range but within the second range, the treatment status indicator may indicate the treatment strategy includes stimulation. When the flow metric is outside the second range of the specification for the flow metric, the treatment status indicator may indicate the treatment strategy includes remediation.

In an embodiment, the asset features and/or the KPIs may have corresponding individual specifications. When a status of an individual asset feature or KPI is over (i.e. an amount, quantity, and/or value greater than) the specification, the treatment strategy may include increasing an amount of chemical treatment product corresponding to the individual asset feature or KPI. When the status of an individual asset feature or KPI is under (i.e. an amount, quantity, and/or value less than) the specification, the treatment strategy may include decreasing an amount of chemical treatment product corresponding to the individual asset feature or KPI In various embodiments, the treatment priority level may be based on differences between the asset data and specifications for the asset features. The treatment priority level may be based on differences between the operations data and specifications for the KPIs. The treatment priority level may indicate whether the oil well is a preventative treatment candidate, a stimulation candidate, or a remediation candidate. An amount of the differences may be used to determine the treatment priority level. No difference or small differences may indicate the oil well is a preventative treatment candidate; larger differences may indicate the oil well is a stimulation candidate; and even larger differences may indicate the oil well is a remediation candidate. The operator UI may include the treatment priority level. The treatment priority level may be displayed as text, an icon, a symbol, a color, a color scheme, and so forth.

In various embodiments, the asset data may include one or more outlier data points corresponding to one or more asset features. The operations data may include one or more outlier data points corresponding to one or more KPIs. The outlier data point may be statistically different enough from a specification for the corresponding KPI or asset feature to warrant review of the operations data or the asset data by a consultant. For example, the outlier data point may be more than two standard deviations from a mean for the corresponding KPI or asset feature. In another example, the outlier data point may be a previously unseen or statistically rare data point. In yet another example, the outlier data point may correspond to a previously unseen or statistically rare asset feature or KPI.

In various embodiments, the outlier data point may influence formulation of the treatment strategy in an unknown and/or extreme way, such as by generating a chemical treatment quantity that is unreasonably high by industry standards. Accordingly, the oil well, asset data, and/or operations data may warrant review by an expert consultant. In various embodiments, the operator UI may include an outlier notifier that prompts the well operator to obtain the consultant. The outlier notifier may include text, an icon, a symbol, a color, a color scheme, and so forth.

Figure 2C:
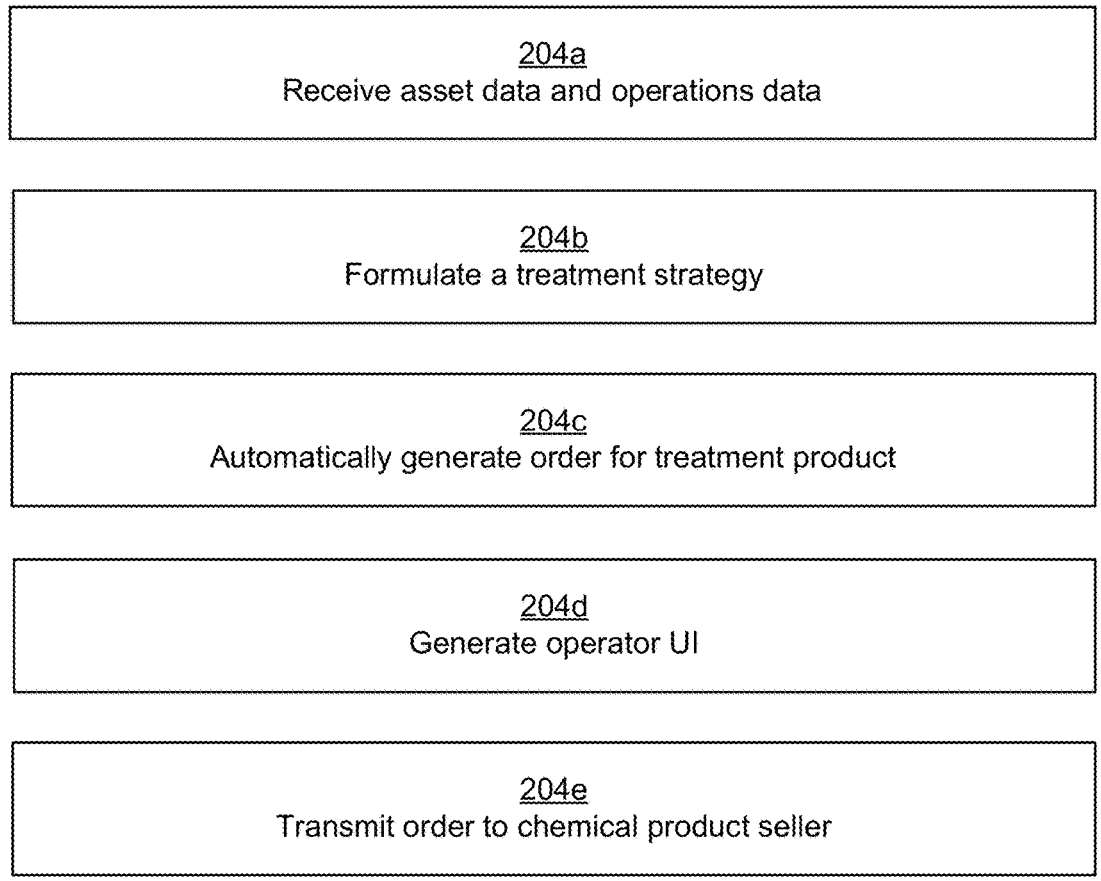
FIG. 2C illustrates a third method of formulating a treatment strategy for an asset and communicating the treatment strategy to an asset owner and/or operator, according to an embodiment.

FIG. 2C illustrates a third method 204 of formulating a treatment strategy for an asset and communicating the treatment strategy to an asset owner and/or operator, according to an embodiment. Some of the features in FIG. 2C are the same as or similar to some of the features in the other FIGs. described herein as noted by same and/or similar reference characters, unless expressly described otherwise. Additionally, reference may be made to features shown in any of the other FIGs. described herein and not shown in FIG. 2C. The method 204 may include: receiving asset data and/or operations data associated with an oil well (block 204*a*); formulating a treatment strategy for the oil well based on the asset data and/or the operations data (block 204*b*); automatically generating an order for treatment product (block 204*c*); generating an operator UI (block 204*d*); and/or transmitting the order to a chemical product seller (block 204*e*).

In various embodiments, the order for chemical treatment product may be automatically generated based on the treatment strategy. The treatment strategy may include an amount and frequency of applying the chemical treatment product. The order may include a quantity of the chemical treatment product that fulfills the amount and frequency for at least a time period between beginning the treatment and reassessing and/or updating the treatment strategy. The operator UI may include the order and an ordering tool that enables the well operator to selectively place the order. When the order is placed, the order may be transmitted to a chemical seller. The automated order generation tied to objective formulation of the treatment strategy may ensure an optimal amount of chemical is purchased. The optimal amount of chemical maximizes production of the oil well for the lowest cost, yielding a maximum return-on-investment in the treatment strategy. When ordering is not directly tied to formulation of the treatment strategy, too much product may be purchased, which leads to unnecessary expense, or too little product may be purchased, which may least to the oil well producing at less than it can produce when it is producing optimally.

Figure 3A:
FIG. 3A illustrates a first operator user interface (UI) for communicating action items regarding a treatment strategy to a well operator, according to an embodiment.

FIG. 3A illustrates a first operator UI 300*a* for communicating action items regarding a treatment strategy to a well operator, according to an embodiment. Some of the features in FIG. 3A are the same as or similar to some of the features in the other FIGs. described herein as noted by same and/or similar reference characters, unless expressly described otherwise. Additionally, reference may be made to features shown in any of the other FIGs. described herein and not shown in FIG. 3A. In an embodiment, the first operator UI 300*a* may be displayed by a display device 302 in an application interface 304. The first operator UI 300*a* may include a map 306, a geographic location 306*a* of an oil well on the map 306, a first visual cue 308*a*, a second visual cue 308*b*, and a menu 310.

In various embodiments, the operator UI may be configured to display on one or more of a variety of different devices. For example, the display device 302 may display the first operator UI 300*a* in the application interface 304. The display device 302 may include and/or be an element of the user device 108. For example, the display device 302 may include a UI of a personal computer, a laptop, a tablet, a smartphone, and so forth. The application interface 304 may include a client application running on, for example, the user device 108, which displays information to a user of the user device 108. The application interface 304 may include a web browser, an application window, and so forth. In various embodiments, the application interface 304 may display via the display device 302 the first operator UI 300a. The first operator UI 300a may include the map 306, the asset list 308, and/or the menu 310. The map 306 may show geographic locations, i.e. the geographic location 306a, of various oil wells and/or assets. The map 306 may include oil wells and/or assets owned, leased, and/or operated by the well operator. The menu 310 may include optional views and/or tools of the operator UI available to the well operator. The menu 310 may exclude access to the engineer UI such that the engineer UI is hidden from the well operator.

The asset list 308 may include a list of all oil wells associated with the well operator or may include a list of treatment candidates. The list may include the first visual cue 308a and the second visual cue 308b. The first visual cue 308a and/or the second visual cue 308b may include text, an icon, a symbol, a color, a color scheme, and so forth. For example, the first visual cue 308a may include color-coded text. The first visual cue 308a may indicate a status of an asset feature and/or a KPI relative to a corresponding specification. The first visual cue 308a may indicate a flow and/or production status of the oil well. The first visual cue 308a may exclude indication of the specific status of the asset feature and/or the KPI, may exclude indication of the corresponding specification, and/or may exclude indication of a specific quantity and/or value associated with a difference between the status and the specification. In an embodiment, the first visual cue 308a may be selectable and, upon selection, cause more detailed information to be displayed. For example, the first visual cue 308a may include the text "Red" that is colored red. Red may indicate the oil well is a remediation candidate. When a user selects the first visual cue 308a, a pop-up window may appear with more specific information describing why the oil well is a remediation candidate.

The second visual cue 308b may give visual indication of the treatment strategy and/or an action item associated with the treatment strategy. For example, the second visual cue 308b may include an arrow pointing upwards on the application interface 304 and indicating an increase in an amount of treatment. The second visual cue 308b may be selectable and, upon selection, cause more detailed information to be displayed. For example, when a user selects the arrow by, for example, clicking on the arrow, a pop-up window may appear with more specific information on the action item and/or treatment strategy. The more specific information may include a type of chemical treatment product, a treatment location, a frequency and/or quantity of treatment, and so forth.

In an embodiment, the first visual cue 308a and/or the second visual cue 308b may be positioned in the asset list 308 adjacent to the map 306 such that the first visual cue 308a and the second visual cue 308b visually correspond to the oil well. In an embodiment, the first visual cue 308a and/or the second visual cue 308b are positioned on the map, such as next to the geographic location 306a of the oil well. In an embodiment, the oil well may be marked, such as according to a color scheme, according to whether and what type of treatment candidate the oil well is. The oil well may be selectable on the map. For example, when a user selects the oil well, such as by clicking on the geographic location 306a, a pop-up window may appear that may include the first visual cue 308a and/or the second visual cue 308b. The pop-up window may include the more detailed information corresponding to the status, specification, treatment strategy, action item, and so forth.

In an embodiment, the operator UI may include a display of an update to the treatment strategy. The display may include a separate visual indication of the updated treatment strategy from the original treatment strategy. The display may include a single visual indication of the treatment strategy that indicates the treatment strategy is an updated treatment strategy. The first visual cue 308a, the second visual cue 308b, or another visual cue may indicate a difference between the original treatment strategy and the updated treatment strategy. For example, The second visual cue 308b may include colored text, where the text describes the treatment strategy (e.g. anti-microbial, anti-foaming, and so forth), and the color of the text may indicate whether the treatment strategy is the original treatment strategy or an updated strategy, such as an updated strategy based on monitoring of the oil well. In an embodiment, the treatment strategy may be updated by an engineer user in the engineer UI. The updated treatment strategy displayed in the operator UI may reflect the change to the treatment strategy from the engineer UI.

A general design aesthetic of the first operator UI 300a, and the operator UI in general, may be minimalistic. For example, the operator UI may include essential information and may exclude non-essential information. The essential information may include identification of oil wells that are treatment candidates (e.g. the map 306 with the geographic location 306a), statuses of the treatment candidates, and action items associated with treatment strategies for the treatment candidates. The minimalistic design aesthetic may cut through the overwhelming amount of data that goes into formulating a treatment strategy to target relevant information to a relevant user.

Figure 3B:
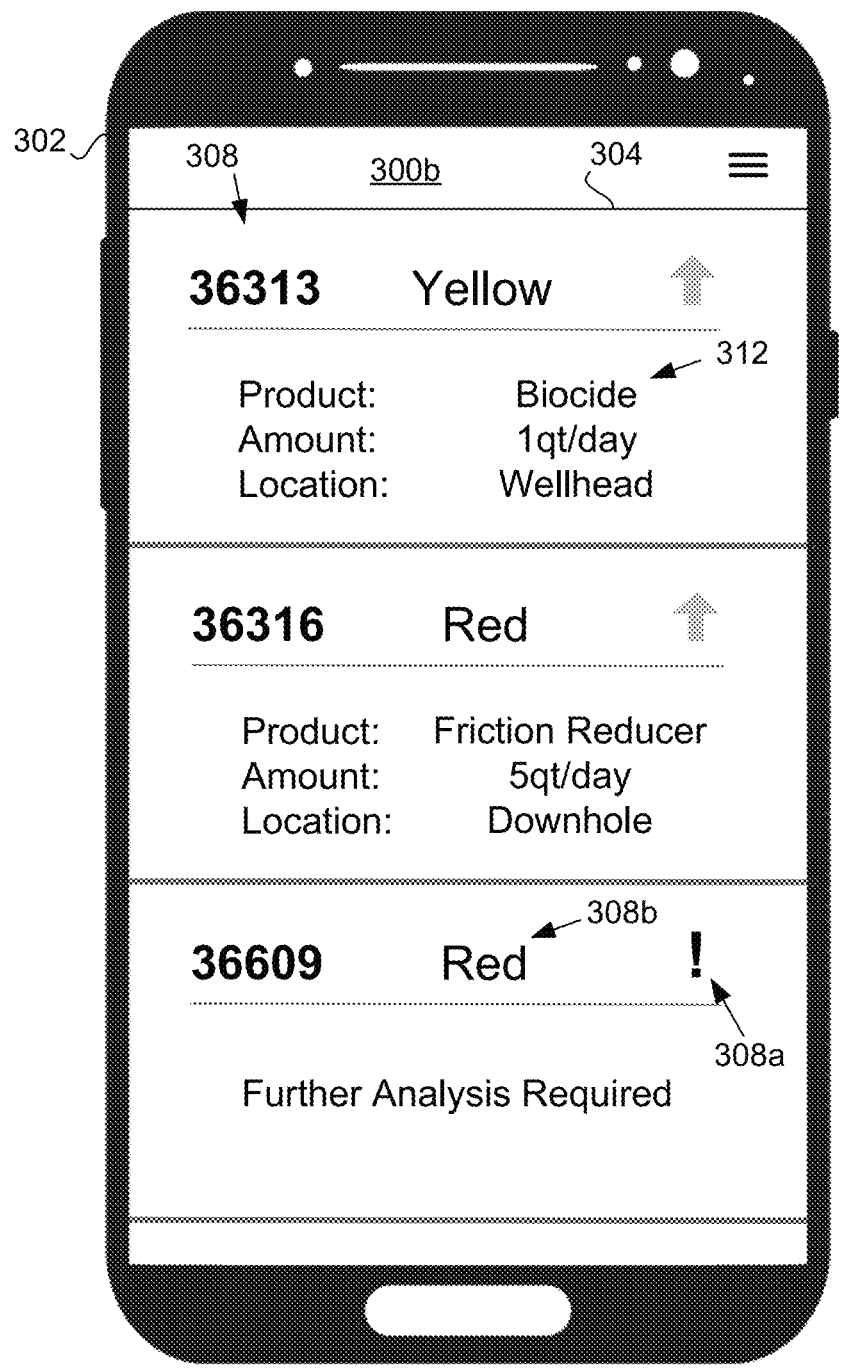
FIG. 3B illustrates a second operator UI for communicating action items regarding a treatment strategy to a well operator, according to an embodiment.

FIG. 3B illustrates a second operator UI 300b for communicating action items regarding a treatment strategy to a well operator, according to an embodiment. Some of the features in FIG. 3B are the same as or similar to some of the features in the other FIGs. described herein as noted by same and/or similar reference characters, unless expressly described otherwise. Additionally, reference may be made to features shown in any of the other FIGs. described herein and not shown in FIG. 3B. In an embodiment, the second operator UI 300b may be displayed by the display device 302 in the application interface 304. The second operator UI 300b may include the asset list 308, the first visual cue 308a, the second visual cue 308b, and/or an action item description 312.

In various embodiments, the second visual cue 308b may indicate an outlier point, an outlier asset feature, and/or an outlier KPI is received for the oil well. For example, the second visual cue 308b may include an exclamation mark. The asset list 308 may include text corresponding to the oil well that may include instructions directing the well operator to obtain a consultant. In various embodiments, the asset list 308 may include the action item description 312. The action item description may include a chemical to be applied in accordance with the treatment strategy, a location along the flowline of the oil well to apply the chemical (e.g. downhole, at the wellhead, to the flowline between the wellhead and the separator, at the separator, to the flowline between the separator and a storage battery, at the storage battery, and so forth), and/or an amount of the chemical to be applied (e.g. a quantity and/or a frequency).

Figure 3C:
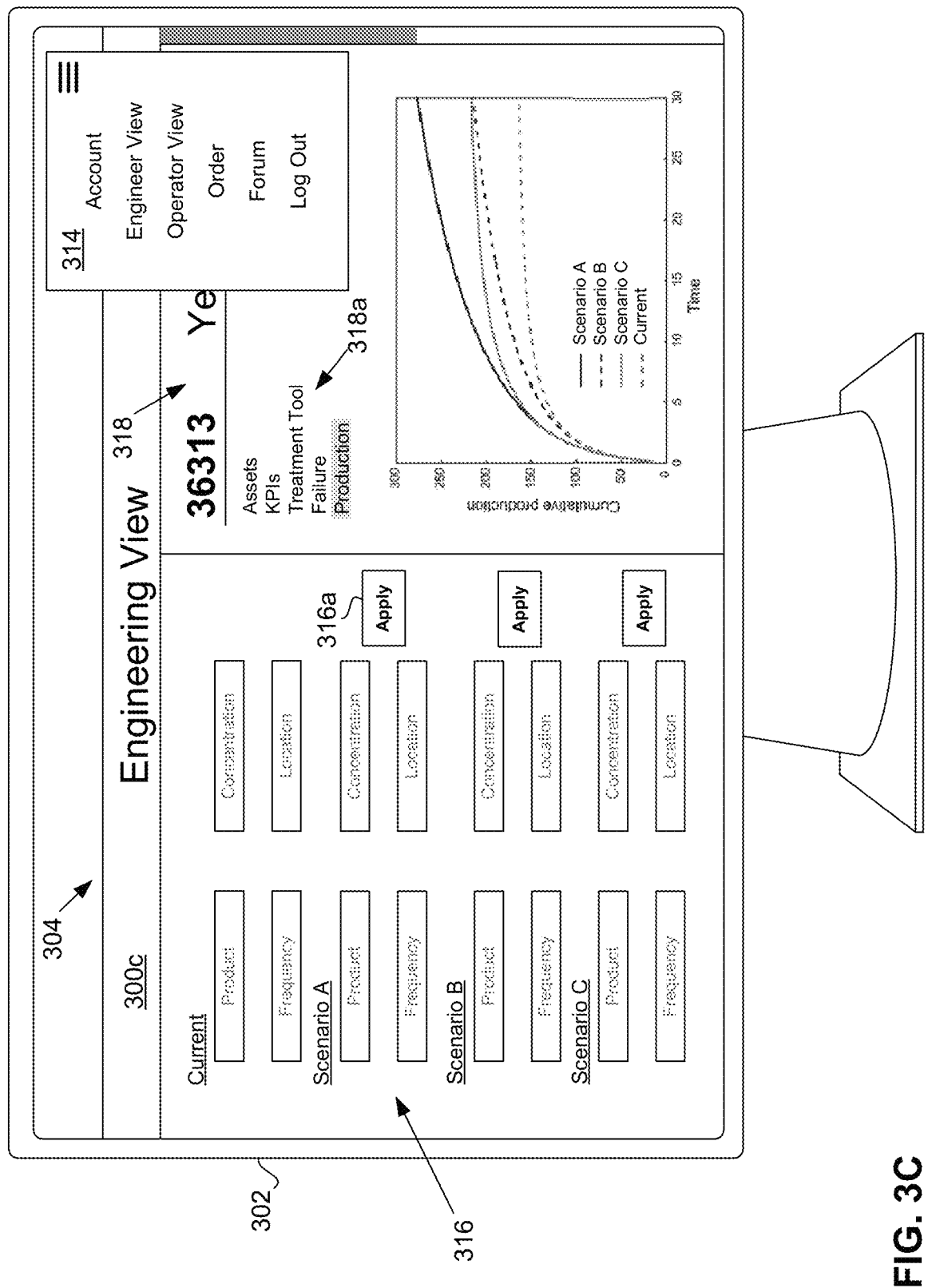
FIG. 3C illustrates an engineer UI for performing data analysis and/or formulating a treatment strategy, according to an embodiment.

FIG. 3C illustrates an engineer UI 300c for performing data analysis and/or formulating a treatment strategy, according to an embodiment. Some of the features in FIG. 3C are the same as or similar to some of the features in the other FIGs. described herein as noted by same and/or similar reference characters, unless expressly described otherwise. Additionally, reference may be made to features shown in any of the other FIGs. described herein and not shown in FIG. 3C. The engineer UI 300c may be displayed to an engineer user on the display device 302 via the application interface 304. The engineer UI 300c may include an engineering menu 314, an inputs interface 316, and/or an outputs display 318. The inputs interface 316 may include an interactive element 316a. The outputs display 318 may include an outputs menu 318a.

The engineering menu 314 may include optional views and/or tools of the engineer UI available to the engineer user. For example, optional views may include an engineering view and an operator view. In the engineering view, the engineer user may view and/or interact with the engineer UI. In the operator view, the engineer user may view and/or interact with the operator UI. The engineer view and the operator view may be selectively displayable to the engineer user. The engineer view may be hidden from the well operator.

In various embodiments, the input interface 316 may include one or more interactive elements (e.g. the interactive element 316a) that may accept inputs from the engineer user. The interactive elements may include text fields, buttons, checkboxes, sliders, tags, icons, progress bars, toggles, dropdown lists, message boxes, modal windows, and so forth. The input interface 316 may display information that may inform inputs by the engineer user. For example, the input interface 316 may display the asset data, the asset features, the operations data, the KPIs, production data, flow metrics, a list of assets of a specific oil well, a list of oil wells associated with the engineer user, the treatment strategy, and so forth.

In various embodiments, the input interface 316 may include interactive elements for accepting inputs corresponding to: a chemical that is part of a treatment strategy; an amount of the chemical applied to the wellstream; a frequency the chemical is added to the wellstream; asset data and/or operations data; current data and/or hypothetical data; a hypothetical treatment strategy; asset features of the oil well and/or KPIs of the oil well; and so forth. The interactive elements may include one or more tools such as: a formulation tool that enables the engineer user to create a change to the treatment strategy; a prediction tool that enables the engineer to enter hypothetical data to generate predictions associated with the oil well such as future failure dates, production declines, total production, and so forth; an upstream tool that accepts inputs and returns outputs (e.g. to the output display 318) corresponding to current or future upstream data; a midstream tool that accepts inputs and returns outputs (e.g. to the output display 318) corresponding to current or future midstream data; a downstream too that accepts inputs and returns outputs (e.g. to the output display 318) corresponding to current or future downstream data; and so forth. Upstream may refer to assets along a flowline of the oil well from a reservoir to a christmas tree. Upstream may refer to exploration and production of a future oil well or a different oil well. Midstream may refer to transport and/or storage of crude oil. Downstream may refer to assets along the flowline from the christmas tree to a refinery. Downstream may refer to oil refinery assets.

In various embodiments, the output display 318 may include dynamic displays of outputs corresponding to inputs from the input interface 316. The output display 318 may include displays of information related to the outputs and/or the inputs. The dynamic displays may be sorted via a menu (e.g. the outputs menu 318a). The menu may sort outputs according to asset feature, KPI, treatment, failure prediction, production prediction, and so forth. The outputs displayed in the output display 318 may include: a predicted change, resulting from an input, in one or more asset features and/or KPIs; a predicted change to one or more asset features and/or the KPIs resulting from the predicted change in the one or more KPIs and/or asset features, respectively; a predicted future production of the oil well; a predicted future failure date of the oil well; a description of a degradation of an asset feature; a cause of a blockage in the flowline; a cause of a condition causing production of the oil well to be less than the maximum potential production of the oil well; and so forth.

In various embodiments, the engineer UI may have a robust functionality. The functionality may include: access to the asset features, the KPIs, the asset data, the operations data; tools such as prediction tools treatment formulation tools, tools for calculating current and/or predicted return-on-investment, tools for creating and/or comparing hypothetical scenarios such as hypothetical treatment strategies; identification of potential treatment candidates, tools prioritizing treatment of a set of wells according to treatment candidacy; and so forth. The robust tools available to the engineer user may enable the engineer user to analyze data associated with the oil well and make manual adjustments to treatment strategies to optimize cost savings and revenue. The robust tools may provide objective, evidence-based information that can be used to formulate the treatment strategy free from influence by a party that may have an interest in, for example, recommending over-treatment.

Figure 4A:
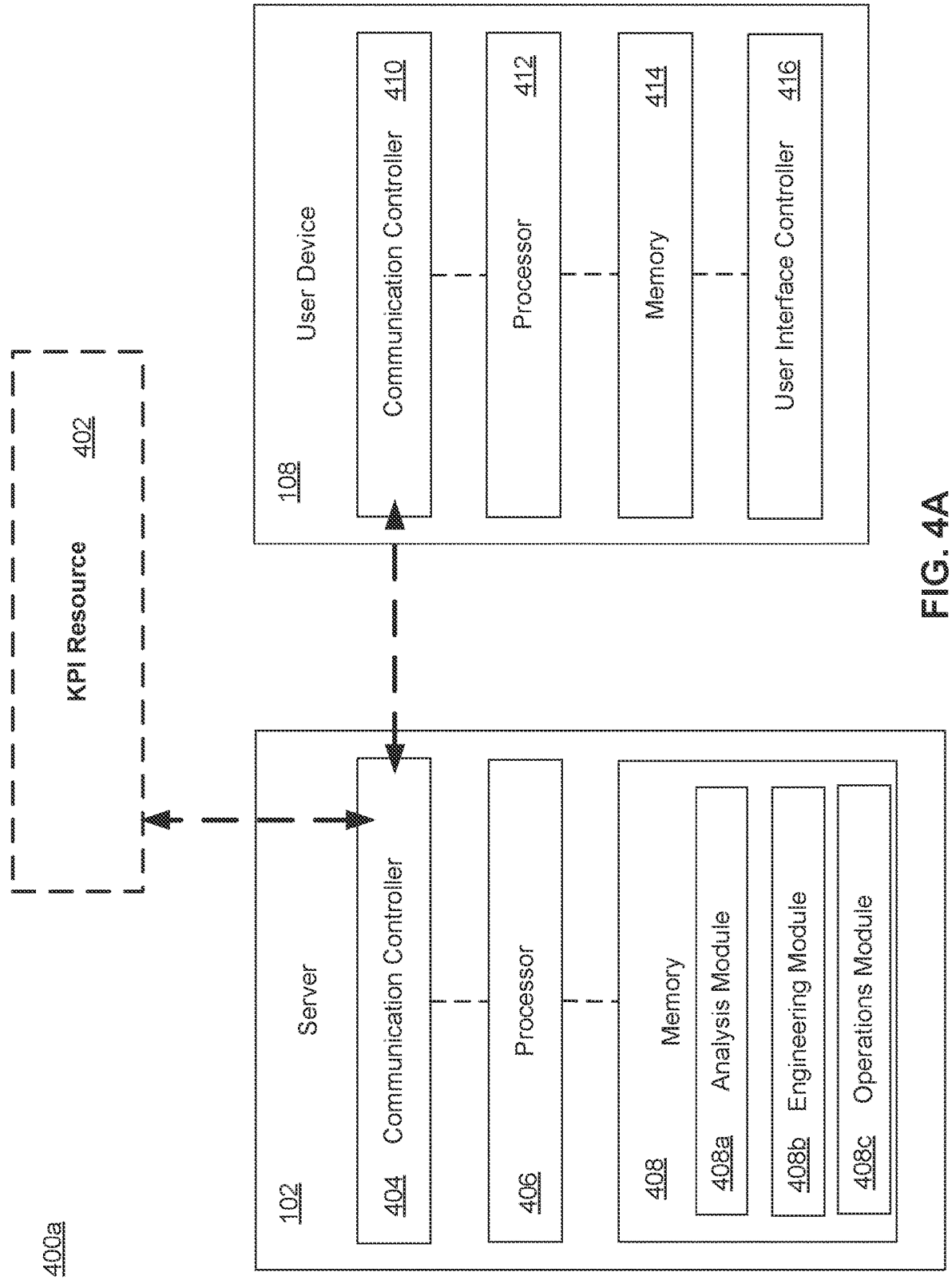
FIG. 4A illustrates a system diagram of a client-server architecture for performing data analysis and/or formulating a treatment strategy, according to an embodiment.

FIG. 4A illustrates a system diagram 400a of a client-server architecture for performing data analysis and/or formulating a treatment strategy, according to an embodiment. Some of the features in FIG. 4A are the same as or similar to some of the features in the other FIGs. described herein as noted by same and/or similar reference characters, unless expressly described otherwise. Additionally, reference may be made to features shown in any of the other FIGs. described herein and not shown in FIG. 4A. In an embodiment, the server 102 may communicate with the user device 108 and a KPI resource 402 (e.g., the asset 104 and/or the assessor 106).

In various embodiments, the server 102 may include: a communication controller 404 that communicates with the user device 108 and the KPI resource 402; a processor 406; and a memory device 408. The memory device 408 may store instructions associated with an analysis module 408a, an engineering module 408b, and/or an operations module 408c. The analysis module 408a may include instructions for performing various data analysis functions described herein such as receiving and storing data, comparing data, formulating a treatment strategy, monitoring the oil well, updating the treatment strategy, and so forth. The engineering module 408b may include instructions for generating the engineer UI and/or performing the various calculations associated with the engineer UI. The operations module 408c may include instructions for generating the operator UI and/or performing the various tasks associated with the operator UI.

The user device 108 may include a communication controller 410, a memory device 412, a processor 414, and/or a user interface controller 416. The server communication controller 404 may communicate information stored in the server memory device 408 to the user device communication controller 410 according to a client-server architecture. The user interface controller 416 may execute instructions for displaying the engineer UI and/or the operator UI according to instructions received from the server 102, stored in the memory 412, and/or executed by the processor 414.

Figure 4B:
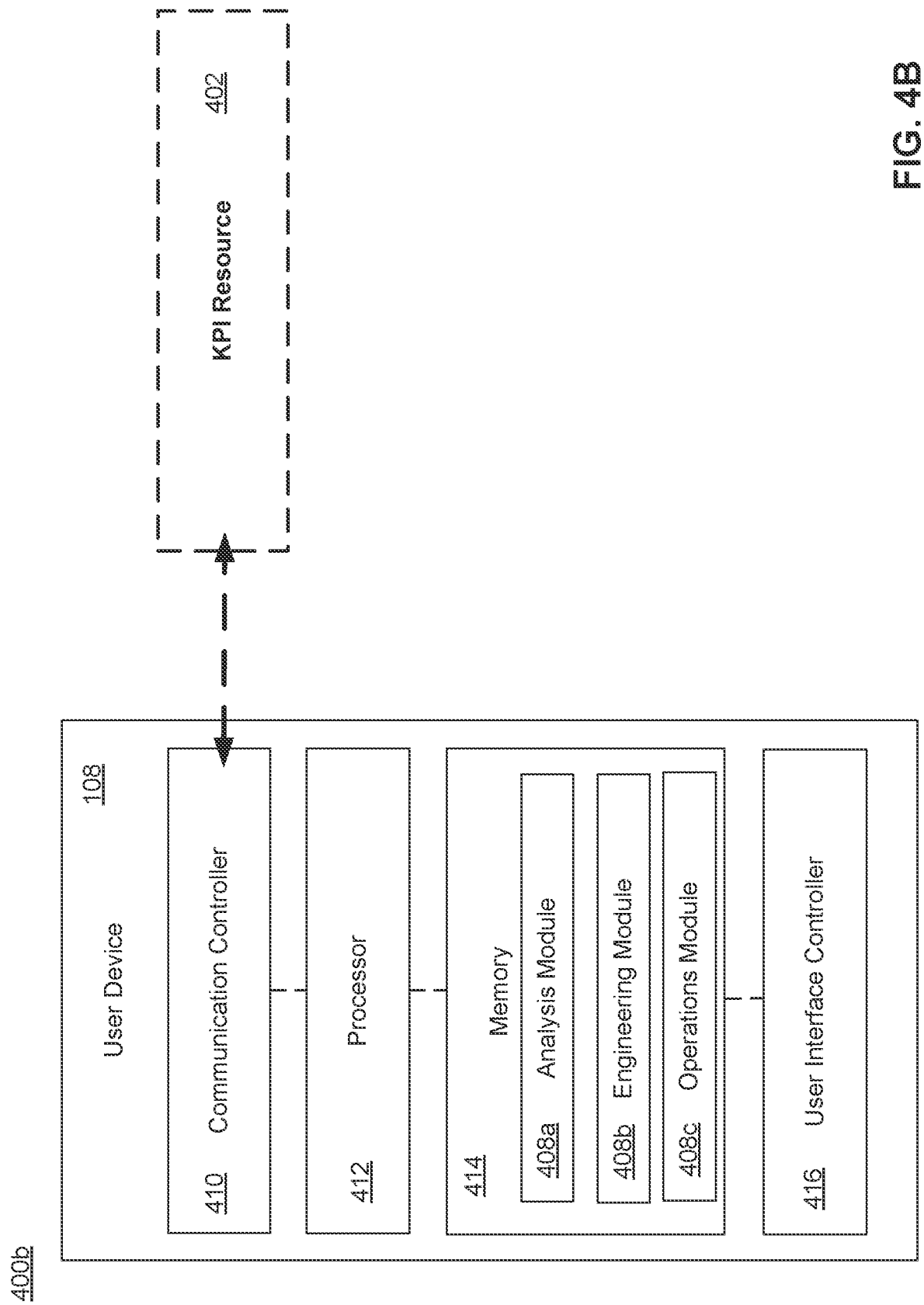
FIG. 4B illustrates a system diagram of a device for performing data analysis and/or formulating a treatment strategy, according to an embodiment.

FIG. 4B illustrates a system diagram 400*b* of a device for performing data analysis and/or formulating a treatment strategy, according to an embodiment. Some of the features in FIG. 4B are the same as or similar to some of the features in the other FIGs. described herein as noted by same and/or similar reference characters, unless expressly described otherwise. Additionally, reference may be made to features shown in any of the other FIGs. described herein and not shown in FIG. 4B. The user device 108 may communicate with the KPI resource 402. Additionally, the memory device 414 of the user device 108 may include the analysis module 408*a*, the engineering module 408*b*, and/or the operations module 408*c*. The user interface controller 416 may generate the engineer UI and/or the operator UI according to instructions stored on the memory device 412 in the analysis module 408*a*, the engineering module 408*b*, and/or the operations module 408*c*. The processor 412 may generate receive inputs and/or generate outputs based instructions stored on the memory device 414 in the analysis module 408*a*, the engineering module 408*b*, and/or the operations module 408*c*. The outputs generated by the processor 414 may be stored in the memory device 414 and may be provided for display to a user via the user interface controller 416.

A processor (e.g. processor 412) may include various electronics for processing electronic signals. The processor may have non-transitory and/or transitory memory, and the memory device (e.g. memory device 414) may have non-transitory and/or transitory memory. For example, the processor may have transitory memory and the memory device may have persistent memory. The processor may generate an output based on an input. For example, the processor may receive an electronic and/or digital signal. The processor may send the signal to the memory device, and the memory device may store the signal. The processor may read the signal and perform one or more tasks with the signal, such as determining an amount of current and/or voltage associated with the signal.

In various embodiments, the processor may include, a microprocessor, a computer processing unit (CPU), a graphics processing unit (GPU), a vision processing unit, a tensor processing unit, a neural processing unit, a physics processing unit, a digital signal processor, an image signal processor, a synergistic processing element, a field-programmable gate array (FPGA), a sound chip, a multi-core processor, and so forth. As used herein, "processor," "processing component," "processing device," and/or "processing unit" may be used generically herein to refer to any or all of the aforementioned specific devices, elements, and/or features of the processing component.

For another example implementation of a system, an instruction in accordance with one example implementation can be used with a system on a chip. One example implementation of a system on a chip includes of a processor and a memory. The memory for one such system is a flash memory. The flash memory can be located on the same die as the processor and other system components. Additionally, other logic blocks such as a memory controller or graphics controller can also be located on a system on a chip.

In the following description, numerous specific details are set forth, such as examples of specific types of processors and system configurations, specific hardware structures, specific architectural and microarchitectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well-known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Instructions used to perform example implementations of the present disclosure can be stored within a memory in the system, such as DRAM, cache, flash memory, or other storage. Furthermore, the instructions can be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs). Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The embodiments of methods, hardware, software, firmware or code set forth above may be implemented via instructions or code stored on a machine-accessible, machine-readable, computer accessible, or computer-readable medium which are executable by a processing element. A non-transitory machine-accessible/readable: medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions may be distributed via a network or by way of other computer-readable media.

Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

The computer-readable storage medium may also be used to store instructions utilizing logic and/or a software library containing methods that call the above applications. While the computer-readable storage medium can be a single medium, the term "computer-readable storage medium" should be taken to include a single medium or multiple media (e.g., a centralized or distributed database, and/or associated caches and servers) that store the one or more sets of instructions. The term "computer-readable storage medium" shall accordingly be taken to include, but not be limited to, solid-state memories, optical media, and magnetic media.

In one example implementation, the architecture may be implemented by one or more micro-architectures, which includes processor logic and circuits used to implement one or more instruction sets. Accordingly, processors with different micro-architectures can share at least a portion of a common instruction set. For example, Intel® Pentium 4 processors. Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set but may include different processor designs. For example, the same register architecture of the may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one example implementation, registers may include one or more registers, register architectures, register files, or other register sets that may or may not be addressable by a software programmer.

In one example implementation, an instruction may include one or more instruction formats. In one example implementation, an instruction format may indicate various fields (number of bits, location of bits, etc.) to specify, among other things, the operation to be performed and the operand(s) on which that operation is to be performed. Some instruction formats may be further broken. defined by instruction templates (or sub formats). For example, the instruction templates of a given instruction format may be defined to have different subsets of the instruction format's fields and/or defined to have a given field interpreted differently. in one example implementation, an instruction is expressed using an instruction format (and, if defined, in a given one of the instruction templates of that instruction format) and specifies or indicates the operation and the operands upon which the operation will operate.

Scientific, financial, auto-vectorized general-purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one example implementation, Single Instruction Multiple Data refers to a type of instruction that causes a processor to perform an operation on multiple data elements. SIMD technology may be used in processors that can logically divide the bits in a register into a number of fixed-sized or variable-sized data elements, each of which represents a separate value. For example, in one example implementation, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one example implementation, a packed data item or vector may be a sequence of packed data elements stored within a single register, and a packed data operand or a vector operand may a source or destination operand of a SIMD instruction (or 'packed data instruction' or a 'vector instruction'). In one example implementation, a SIMD instruction specifies a single vector operation to be performed on two source vector operands to generate a destination vector operand (also referred to as a result vector operand) of the same or different size, with the same or different number of data elements, and in the same or different data element order.

In one example implementation, destination and source registers/data are generic terms to represent the source and destination of the corresponding data or operation. In some example implementations, they may be implemented by registers, memory, or other storage areas having other names or functions than those depicted. For example, in one example implementation, "DEST1" may be a temporary storage register or other storage area, whereas "SRC1" and "SRC2" may be a first and second source storage register or other storage area, and so forth. In other example implementations, two or more of the SRC and DEBT storage areas may correspond to different data storage elements within the same storage area (e.g., a SIMD register). In one example implementation, one of the source registers may also act as a destination register by, for example, writing back the result of an operation performed on the first and second source data to one of the two source registers serving as a destination registers.

A module as used herein may refer to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a. non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured. to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, may refer to some apparatus, logic, hardware, and/or element designed in such a way to enable use of the apparatus, logic, hardware, and/or element in a specified manner. Note as above that use of to, capable to, or operable to, in one embodiment, may refer to the latent state of an apparatus, logic, hardware, and/or element, where the apparatus, logic, hardware, and/or element is not operating, but is designed in such a manner to enable use of an apparatus in a specified manner.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example but may refer to different and distinct embodiments, as well as potentially the same embodiment.

Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. in addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

The above description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

It is to be understood that the above description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The disclosure above encompasses multiple distinct embodiments with independent utility. While these embodiments have been disclosed in a particular form, the specific embodiments disclosed and illustrated above are not to be considered in a limiting sense as numerous variations are possible. The subject matter of the embodiments includes the novel and non-obvious combinations and sub-combinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims is to be understood to incorporate one or more such elements, neither requiring nor excluding two or more of such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. A device, comprising:
a processing device; and
a memory device communicatively coupled to the processing device and storing instructions that, when executed by the processing device, cause the processing device to:
receive asset data corresponding to a plurality of different asset features of an oil well, wherein the asset features are drawn from an asset category comprising asset integrity, flow assurance, or phase separation;
receive operational data corresponding to a plurality of different key performance indicators (KPIs) of an oil well;
determine an operational status of the oil well based on the asset data and the operational data, wherein the operational status indicates the oil well is a stimulation candidate or the oil well is a remediation candidate;
formulate a treatment strategy for the oil well based on the asset data, the operational data, and the operational status;
generate an operator user interface (UI) comprising information tailored in scope for a well operator, wherein the information comprises:
the operational status; and
an action item of the treatment strategy;
display the operator UI to the well operator;
generate an engineer UI tailored in scope for an engineer user, wherein the engineer UI comprises an engineering tool; and
selectively display the operator UI or the engineer UI to the engineer user.

2. The device of claim 1, wherein the operator UI comprises a map showing:
a geographic location of the oil well;
a first visual cue that indicates a status of one of the KPIs relative to a specification for the one KPI, wherein the first visual cue:
is positioned on the map, such that the first visual cue visually corresponds to the oil well or the geographic location of the oil well; or
is positioned adjacent to the map; and
a second visual cue indicating the action item, wherein the second visual cue:
is positioned on the map, such that the first visual cue visually corresponds to the oil well or the geographic location of the oil well; or
is positioned adjacent to the map.

3. The device of claim 1, wherein the instructions, when executed by the processing device, cause the processing device to:
monitor an effectiveness of the treatment strategy in stimulating or remediating the oil well by assessing subsequent asset data and subsequent operational data that are received subsequent to implementation of the treatment strategy; and
updating the treatment strategy based on the effectiveness by:
decreasing an amount of treatment chemical applied to the oil well;
increasing the amount of the treatment chemical applied to the oil well; or
applying a different treatment chemical.

4. The device of claim 3, wherein the operator UI comprises:
the updated treatment strategy; and
a visual cue indicating to the well operator a difference between the treatment strategy and the updated treatment strategy.

5. The device of claim 1, wherein the different KPIs comprise a pH of a wellstream of the oil well, a wellstream temperature, a wellstream pressure, a wellstream volume, a location at the oil well where a measurement or a sample is taken, a type of artificial lift employed at the oil well, a wellstream aqueous $CO_2$ content, a wellstream aqueous $H_2S$ content, a wellstream aqueous $O_2$ content, a $CO_2$ partial pressure of the wellstream, an $H_2S$ partial pressure of the wellstream, an amount of gaseous $CO_2$ in the wellstream, an amount of gaseous $H_2S$ in the wellstream, a wellstream iron content, a wellstream manganese content, an amount of sulfate-reducing bacteria (SRB) in the wellstream, an amount of acid-producing bacteria (APB) in the wellstream, an adenosine triphosphate (ATP) content of the wellstream, corrosion of oil well assets due to the wellstream, paraffin content of the wellstream, asphaltene content of the wellstream, a calcium carbonate content of the wellstream, a barium sulfate content of the wellstream, an iron sulfide content of the wellstream, an iron carbonate content of the wellstream, a hydrous or anhydrous calcium sulfate content of the wellstream, a strontium sulfate content of the wellstream, a strontium carbonate content of the wellstream, a millipore throughput of the wellstream, a hydrocarbon content of the wellstream, a salt content of the wellstream, a carbonate content of the wellstream, a soluble acid content of the wellstream, an insoluble acid content of the wellstream, a total solids content of the wellstream, a total suspended solids content of the wellstream, a total dissolved solids content of the wellstream, a volatile suspended solids content of the wellstream, a hardness of the wellstream, an alkalinity of the wellstream, a bicarbonate compound content of the wellstream, a conductivity of the wellstream, a resistivity of the wellstream, a phosphate content of the wellstream, an amine content of the wellstream, a phosphonate content of the wellstream, a chloride content of the wellstream, a sodium content of the wellstream, a specific gravity of the wellstream, a water-in-oil content of the wellstream, an oil-in-water content of the wellstream, an american petroleum institute (API) gravity of the wellstream, a cloud point of the wellstream, a pour point of the wellstream, an oil content of the wellstream, a grease content of the wellstream, a basic sediment and water (BS&W) grindout of the wellstream, gas chromatography results of the wellstream, a wax appearance temperature of the wellstream, a cation content of the wellstream, an anion content of the wellstream, and a dissolved gas content of the wellstream.

6. The device of claim 1, wherein the engineer UI comprises a calculator configured to:
receive, as inputs:
a chemical that is part of the treatment strategy;
an amount of the chemical applied to a wellstream of the oil well; and
a frequency the chemical is added to the wellstream; and
generate, as an output:
a predicted change, resulting from the inputs, in one of the KPI; and
a predicted change to an asset feature resulting from the predicted change to the one KPI.

7. The device of claim 1, wherein the engineer UI comprises:
an upstream tool configured to:
accept inputs corresponding to the asset data, the operational data, or hypothetical data; and
return upstream-related outputs corresponding to current or future upstream data,
wherein upstream refers to:
assets along a flowline of the oil well from a reservoir to a christmas tree; or
exploration and production of a future oil well or a different oil well;
a midstream tool configured to:
accept inputs corresponding to the asset data, the operational data, or the hypothetical data; and
return midstream-related outputs corresponding to current or future upstream data,
wherein midstream refers to transport and storage of crude oil; or
a downstream tool configured to:
accept inputs corresponding to the asset data, the operational data, or the hypothetical data; and
return downstream outputs corresponding to current or future upstream data,
wherein downstream refers to:
assets along the flowline of the oil well from the christmas tree to a refinery; or
oil refinery assets.

8. A device, comprising:
a processing device; and
a memory device communicatively coupled to the processing device and storing instructions that, when executed by the processing device, cause the processing device to:
receive asset data corresponding to a plurality of different asset features of an oil well;
receive operational data corresponding to a plurality of different key performance indicators (KPIs) of an oil well;
determine an operational status of the oil well based on the asset data and the operational data;
formulate a treatment strategy for the oil well based on the asset data, the operational data, or the operational status;
generate an operator user interface (UI) comprising information tailored in scope for a well operator, wherein the information comprises an action item of the treatment strategy;
generate an engineer UI tailored in scope for an engineer user; and
selectively display the operator UI or the engineer UI, wherein:
the operator UI is displayed to the well operator; and
the engineer UI is displayed to the engineer user.

9. The device of claim 8, wherein:
the treatment strategy comprises a monitoring frequency based on a difference between a status of one of the KPIs and a specification for the one KPI;
the monitoring frequency minimizes an amount of treatment chemical applied to the oil well to stimulate or remediate the oil well; and
the monitoring frequency comprises a frequency of:
assessing the one KPI during execution of the treatment strategy; and
comparing the one KPI to the specification for the one KPI.

10. The device of claim 8, wherein the instructions, when executed by the processing device, cause the processing device to:
compare a status corresponding to an individual KPI to a specification for the individual KPI;
in response to the status being over the specification, formulate the treatment strategy to include or increase an amount of a chemical treatment product corresponding to the individual KPI; and
in response to the status being under the specification, formulate the treatment strategy to exclude or decrease an amount of the chemical treatment product.

11. The device of claim 10, wherein the action item displayed to the well operator comprises:
applying the chemical treatment product to a wellstream of the oil well at a specified location along a flowline of the oil well;
increasing the amount of the chemical treatment product; or
decreasing the amount of the chemical treatment product.

12. The device of claim 8, wherein the engineer UI comprises a calculator configured to:
receive, as inputs:
current or hypothetical asset data;
current or hypothetical operational data; and
a hypothetical treatment strategy; and
generate, as outputs based on the inputs:
predicted future production of the oil well; or
a predicted future failure date of the oil well.

13. The device of claim 8, wherein the instructions, when executed by the processing device, cause the processing device to receive a pre-treatment flow metric of a wellstream of the oil well, wherein:
the operator UI comprises a treatment status indicator;
in response to the flow metric being within a first range of a specification for the flow metric, the treatment status indicator indicates the treatment strategy comprises preventative treatment;
in response the flow metric being outside the first range of the specification for the flow metric but within a second range of the specification for the flow metric, the treatment status indicator indicates the treatment strategy comprises stimulation; and
in response to the flow metric being outside the second range of the specification for the flow metric, the treatment status indicator indicates the treatment strategy comprises remediation.

14. The device of claim 8, wherein:
the instructions, when executed by the processing device, cause the processing device to assign the oil well a treatment priority level based on:
differences between the asset data and specifications for the asset features; or
differences between the operational data and specifications for the different KPIs;
the treatment priority level indicates whether the oil well is a preventative treatment candidate, a stimulation candidate, or a remediation candidate; and
the operator UI comprises the treatment priority level.

15. A method, comprising:
receiving, by a processor, asset data corresponding to a plurality of different asset features of an oil well;
receiving, by the processor, operational data corresponding to a plurality of different key performance indicators (KPIs) of an oil well;
formulating, by the processor, a treatment strategy for the oil well based on one or more correlations between the asset data and the operational data;
generating, by the processor, an operator user interface (UI) comprising information tailored in scope for a well operator, wherein the information comprises the treatment strategy;
generating, by the processor, an engineer UI tailored in scope for an engineer user, wherein the engineer UI comprises one or more predictive calculators; and
selectively displaying by a display:
the operator UI to the well operator; or
the engineer UI to the engineer user.

16. The method of claim 15, wherein:
the one or more correlations indicate:
a degradation of an asset feature;
a blockage of a wellstream of the oil well; or
a condition of a fluid in the wellstream that causes a production of the oil well to be less than a maximum potential production of the oil well; and
the treatment strategy comprises applying a chemical treatment to resolve the degradation, the blockage, or the condition;
the operator UI comprises:
a first graphical object indicating a chemical to be applied to the oil well;
a second graphical object indicating a location along a flowline of the oil well to apply the chemical; and
a third graphical object indicating an amount of the chemical to be applied; and
the engineer UI comprises:
a fourth graphical object indicating a description of the degradation of the asset feature;
a fifth graphical object indicating a cause of the blockage; and
a sixth graphical object indicating a cause of the condition causing the production of the oil well to be less than the maximum potential production.

17. The method of claim 15, comprising:
automatically generating an order for a chemical treatment product based on the treatment strategy, wherein the operator UI comprises:
the order; and
an ordering tool that enables the well operator to selectively place the order; and
transmitting the order to a chemical seller upon selection in the operator UI to order the chemical treatment product.

18. The method of claim 15, wherein:
the engineer UI comprises the treatment strategy;
the engineer UI comprises a formulation tool that enables the engineer user to create a change to the treatment strategy; and
the operator UI comprises the treatment strategy with the change to the treatment strategy.

19. The method of claim 15, wherein:
the operator UI is selectively displayable to the engineer user; and
the engineer UI is hidden from the operator user such that the operator user does not have access to the engineer UI.

20. The method of claim 15, comprising:
comparing the operational data to a set of operational specifications for the plurality of different KPIs; and
identifying an outlier data point of an individual KPI, wherein:
the outlier data point is statistically different enough from a specification for the individual KPI to warrant review of the operational data or the asset data by a consultant; and
the operator UI comprises an outlier notifier that prompts the operator to obtain the consultant.

* * * * *